July 15, 1952 — E. C. HORTON — 2,603,289

VIBRATING RUBBER SHEARS

Filed Jan. 8, 1949

INVENTOR.
Erwin C. Horton
BY Bean, Brooks, Buckley & Bean.
ATTORNEYS.

Patented July 15, 1952

2,603,289

UNITED STATES PATENT OFFICE 2,603,289

VIBRATING RUBBER SHEARS

Erwin C. Horton, Hamburg, N. Y., assignor to Trico Products Corporation, Buffalo, N. Y.

Application January 8, 1949, Serial No. 69,934

8 Claims. (Cl. 164—41)

This invention relates to a machine for cutting rubber sheets or material and it has for its primary aim and object to provide an arrangement by which soft rubber and like elastic material may be given a practically clean shearing cut. In forming strips of rubber from sheet stock, difficulty has been experienced in securing a smooth, accurate cut free from ragged edges.

In accordance with the present invention, means are provided to facilitate the movement of the shearing edge or cutter through the elastic stock so as to produce a sharp and accurate rubber edge devoid of irregularities which might impair the use of the severed strip or body as a squeegee for cleaning highly polished surfaces.

A further object of the invention is to provide a mode of cutting elastic stock material in a practical manner which will facilitate the operation and enable the practice of the invention throughout the rubber industry.

The foregoing and other objects will manifest themselves as the following description progresses, reference being had to the accompanying drawing, wherein Figs. 1, 2, 3, and 4 show different machines each embodying the inventive concept and teaching of the present invention.

Figure 1:
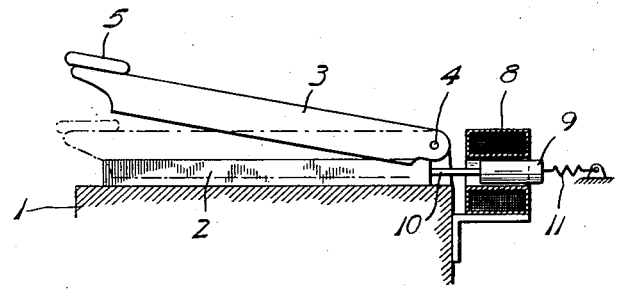
Figure 2:
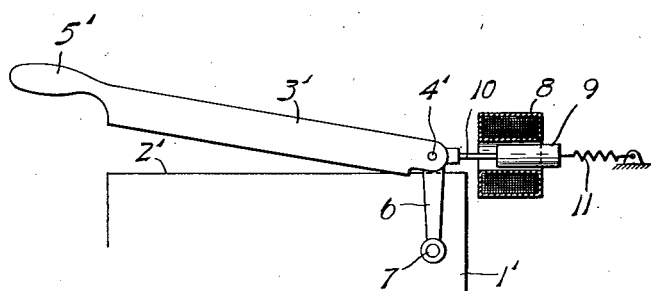

Referring more particularly to the drawing, and especially to Fig. 1, the numeral 1 designates the machine bed having a fixed blade 2 and a relatively movable blade 3, the latter being pivotally mounted at 4 and having suitable means 5 by which the required power may be applied to move the cutting blade 3. While the power may be applied mechanically or electrically, for the purposes of this disclosure such illustrated means is in the form of a pad for receiving the hand pressure. The movable blade is preferably pivotally mounted on the bed 1.

According to the present invention, means are provided for imparting vibratory motion to one or the other, or both, of the blades. In Fig. 1 such vibratory action is imparted to the fixed or bed blade, while in Fig. 2 such vibratory motion is imparted to the movable blade 3' which latter is depressed through the handle 5' for coaction with the fixed blade 2'. In order to accommodate this vibratory motion, the pivotal mounting 4' for the movable blade is carried by a floating link 6 which in turn is pivotally mounted at 7 on the bed 1'. The means for imparting this vibratory motion comprises an electro-magnet having a coil 8 and a core or armature 9, the movable element being connected by a rod or link 10 to the vibratory blade. A spring 11 imposes an urge on the movable element of the electro-magnet for being counteracted by the energized coil. The cycle or frequency of vibration is in synchronism with the cycle or frequency of current alternation, which is usually 60 cycle, or it may be 25 cycle, or the like.

When the current is turned on to energize the electro-magnet or solenoid the frequency of the current interruptions will impress itself upon the mechanically connected blade and against the urge of the spring 11, with the latter acting to return the blade to its normal position during the intervals of circuit interruption. While the vibratory motion may not be perceptible to the eye, nevertheless there is a vibration set up in the connected blade which may be felt and which will serve to facilitate the easy shearing movement of the cutting blade through the elastic material.

Figure 3:
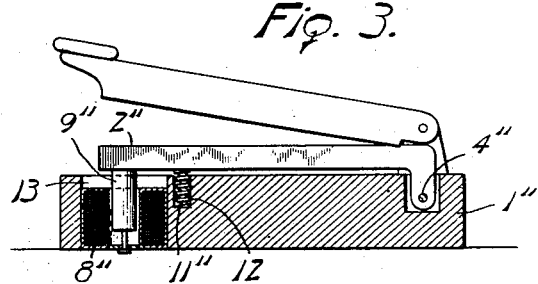

In Fig. 3 the fixed blade, the term "fixed" being a relative one, is pivotally mounted on the bed 1" at 4", with the spring 11" being interposed between the blade and the bed and confined within a recess 12. The magnet 8" is likewise confined within a recess 13 in the bed, with the core or armature 9" being fixedly carried by the free end of the fixed blade 2".

Figure 4:
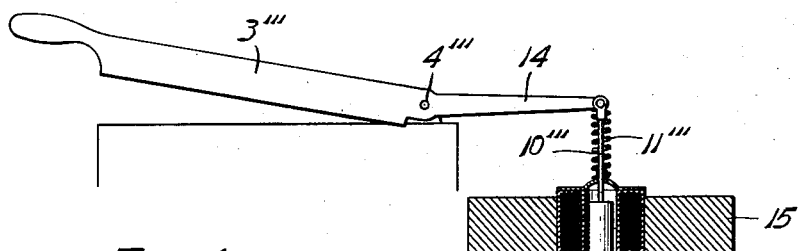

In the embodiment depicted in Fig. 4 the movable blade 3''' has an arm 14 extending beyond its pivot 4''' and resiliently suspending a counterweight 15 through a spring 11''' and the magnet 8''' which is fixed within a recess in the weighted body 15. The armature or core 9''' is connected by a link 10''' to the arm 14. Through this suspension the energization of the magnet will intermittently attract the core and set up the desired vibration in the blade as it passes through the elastic body.

The resulting cutting action is expedited in a practical manner and produces a clean cut devoid of ragged edges.

While the foregoing description has been given in detail it is without thought of limitation since the inventive principles involved are capable of assuming other physical embodiments without departing from the spirit of the invention and the scope of the appended claims.

What is claimed is:

1. A rubber cutting machine comprising a relatively fixed blade, a shearing blade complementingly opposing said fixed blade and coacting therewith, means for bring the blades together for a cutting operation, and electro-magnetic means operable by power frequency alternating current and connected to one blade to vibrate it during the cutting operation in synchronism with the cyclic frequency of the alternating current employed.

2. A shearing machine comprising a bed blade, a coacting blade opposing said bed blade and related thereto for producing a shearing cut, means for bringing the blades together for a cutting operation, and means connected to one blade and acting at a frequency established by an operating alternating current to set up a vibratory response of minute amplitude in such blade during the cutting operation.

3. A cutting machine comprising a pair of cooperable shearing blades, means for bringing the blades together for a cutting operation, and electrical means connected to one blade and operating in the frequency of an energizing alternating current to so vibrate such blade during the shearing cutting action.

4. A rubber cutting machine comprising a relatively fixed blade, and an opposing movable blade, means for bringing the blades together for a cutting operation, and an electro-magnet energizable by an alternating current and having its movable element connected to the relatively fixed blade for vibrating it during the cutting operation in synchronism with the cyclic frequency of the alternating current employed.

5. A rubber cutting machine comprising a fixed blade and a cooperating pivotally mounted blade, means for bringing the blades together for a cutting operation, with electro-magnetic means energizable by an alternating current and having its movable element connected to the pivotal blade for vibrating it during the cutting operation in corresponding response to the frequency of the alternating current.

6. A machine for shearing sheet-form rubber comprising a bed, a pair of opposed straight blades coacting to produce a shearing cut, means for bringing the blades together for a cutting operation, resilient means normally urging one blade to its normal position, with an electro-magnetic means energizable by power frequency alternating current and responsive to the frequency of the current for setting up a corresponding vibration of minute amplitude in said one blade against the urge of said resilient means during the cutting operation.

7. A rubber cutting machine comprising a bed, a pair of blades coacting to produce a shearing cut, means for bringing the blades together for a cutting operation, resilient means normally urging one blade to its normal position, with an electro-magnetic means energizable by an alternating current and responsive to the frequency of the current for setting up a corresponding vibration in said one blade against the urge of said resilient means during the cutting operation, said electro-magnetic means having a coil embedded in a recess in the bed of the machine.

8. A rubber cutting machine comprising a fixed blade, a movably mounted shearing blade, means for bringing the blades together for a cutting operation, counterbalance means normally holding the movable blade in an open position, resilient means suspending the counterbalancing means, electro-magnetic means energizable by an alternating current and acting in response to the frequency of the current to oscillate the counterbalancing means and thereby vibrate the movable blade during the cutting operation in synchronism with the frequency of the alternating current.

ERWIN C. HORTON.

REFERENCES CITED

The following references are of record in the file of this patent:

UNITED STATES PATENTS

| Number | Name | Date |
| --- | --- | --- |
| 818,589 | Wegner | Apr. 24, 1906 |
| 1,204,922 | Wilms | Nov. 14, 1916 |
| 1,502,120 | Rasmussen | July 22, 1924 |
| 1,583,583 | Dominguez | May 4, 1926 |
| 1,955,004 | Lodge | Apr. 17, 1934 |
| 2,015,160 | Shaler | Sept. 24, 1935 |